United States Patent [19]

Heinmets

[11] 4,248,089
[45] Feb. 3, 1981

[54] TEMPERATURE MEASURING

[76] Inventor: Ferdinand Heinmets, c/o Dynatrend Incorporated 131 Middlesex St., Burlington, Mass. 01803

[21] Appl. No.: 611,231
[22] Filed: Sep. 8, 1975
[51] Int. Cl.³ .......................................... G01N 25/04
[52] U.S. Cl. ...................................................... 73/356
[58] Field of Search ............ 73/356, 358; 116/114 V, 116/114.5

[56] References Cited

U.S. PATENT DOCUMENTS

| | | | |
|---|---|---|---|
| 3,175,401 | 3/1965 | Geldmacher | 73/358 |
| 3,430,491 | 3/1969 | Gignilliat | 73/358 |
| 3,440,882 | 4/1969 | Jones | 73/356 |
| 3,465,590 | 9/1969 | Kluth et al. | 73/556 |
| 3,580,079 | 5/1971 | Crites et al. | 73/358 |
| 3,631,720 | 1/1972 | Weinstein | 73/358 |
| 3,633,425 | 1/1972 | Sanford | 73/356 |
| 3,733,905 | 5/1973 | Bremer | 73/356 |
| 3,859,856 | 1/1975 | Keele et al. | 73/356 |
| 3,871,232 | 3/1975 | Pickett et al. | 73/356 |
| 3,920,574 | 11/1975 | Brown, Jr. et al. | 73/356 X |
| 3,980,581 | 9/1976 | Godsey et al. | 252/408 |

Primary Examiner—Gerald Goldberg
Assistant Examiner—Joseph W. Roskos
Attorney, Agent, or Firm—Charles Hieken

[57] ABSTRACT

A reversible disposable thermometer usable as a safe, convenient and low cost replacement for the mercury in glass clinical thermometer, comprises temperature indicating materials, with controllable and precise melting points, embedded in a flat probe, wherein they are arranged into an indicating matrix, located on both sides of the probe, which covers the physiological temperature range of humans in 0.2° F. steps, and supplemented by a means of affecting the crystallization process of the compounds so that the melting process is accurately definable and the difference between melted and unmelted stage is readily discernible, such means preferably comprising cationic dye seeding in the materials to multiply crystal nucleation sites for fineness of crystal structure and to provide light scattering properties and, further to reduce solidification induction time to make the thermometer reversible and reusable.

25 Claims, 5 Drawing Figures

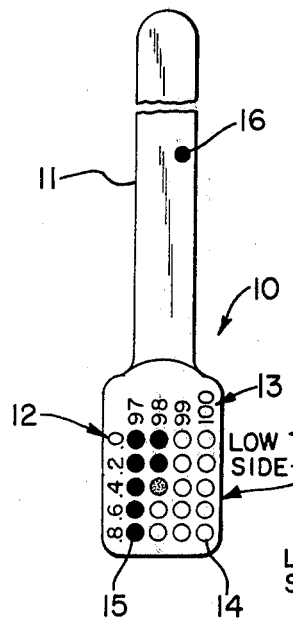
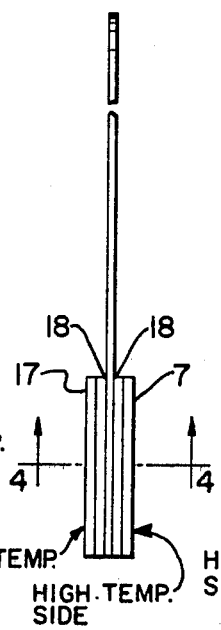
FIG. 1   FIG. 3   FIG. 2
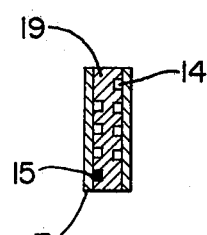
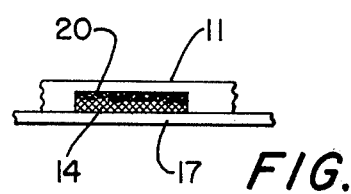
FIG. 4   FIG. 5

TEMPERATURE MEASURING

BACKGROUND OF THE INVENTION

The present invention relates generally to thermometers and more particularly to a thermometer that is capable of meeting the criteria of a truly disposable system which can replace the existing mercury in glass thermometers. The invention is particularly characterized by use of readily available materials, economy, ease of manufacture, lack of need to be activated prior to use, lack of special handling or storage requirements, easily discernible temperature responsive change and, further, providing patient comfort in that the measurement locus is one half as long as in existing systems and in that the insertion time is less than thirty seconds, consistent with covering the accepted range and accuracy for fever thermometers.

The principle utilized in many prior art disposable thermometers if the detection of a change in state of a temperature indicating substance. Systems differ in the choice of substances and in the detection means. The temperature indicating substances of prior art disclosures include adjacent members of the even number series of fatty acids, halogenated carbon waxes or a wide variety of white crystalline solids, all with melting ranges between 36° and 42° C. The detection systems utilizing such materials include movement of a liquid melt to a corresponding cavity, the use of indicators below solid substances which become visible because the compounds are transparent when liquid, and the absorption of a liquid melt into an indicating compound forming a eutectic mixture with the indicator system thereby generating additional liquid which facilitates visual detection. These disposable thermometers have deficiencies which result in devices that do not meet the necessary criteria for a disposable system. Prominent among these are the difficulty of distinguishing the precise temperature level reached; intended use of many such devices only as screening devices with five or less indicators; complicated construction, in some instances, involving up to seven layers of materials and intermovements in the system making them very costly to manufacture; and requirements of special handling during shipment and storage for irreversible versions or activation means for reversible versions in some devices. The advantages of such prior art products over the conventional mercury thermometer are offset by such limiting defects. p It is an important object of the invention to provide a disposable thermometer avoiding the above defects.

It is a further object of the invention to provide precise temperature indications consistent with the preceding object.

It is a further object of the invention to provide highly discernible temperature indications consistent with one or both of the preceding objects.

It is a further object of the invention to provide a reliably reversible thermometer consistent with one or more of the preceding objects.

It is a further object of the invention to provide a modular thermometer product line which can be rendered in reversible or non-reversible forms consistent with one or more of the preceding objects.

It is a further object of the invention to provide a small measurement locus consistent with one or more of the preceding objects.

It is a further object of the invention to provide low measurement time consistent with one or more of the preceding objects.

It is a further object of the invention to provide a low cost thermometer consistent with one or more of the preceding objects.

SUMMARY OF THE INVENTION

According to the invention, a disposable thermometer device comprises means defining an array of shallow containers for holding meltable materials of progressively higher melting points. The melted material within each container does not move and does not mix with other materials; it stays in place. Contrast between the melted and unmelted materials of different containers is attained by providing good light scattering properties when each such material is solid and by the use of contrasting background of a container wall, externally visible when the contained material is in the liquid stage.

Preferred temperature indicating compounds utilized in this system are mixtures of hendecanoic, tridecanoic and pentadecanoic acids. The precise melting points required are provided by controlling the relative ratio of the individual acid molecules in a mixture. Monitoring of the liquidus line melting transition temperature gives a reliable indication of temperature level exposure over the entire range of clinical interest.

It has been discovered that by the addition of small amounts of certain agents into the mixtures it is possible to generate rapid crystallization and influence crystallite size so as to scatter light in a visible spectrum range making the temperature indicating compounds noticeably opaque when solid. The agents most effective in modifying the crystal growth of a temperature indicating compound are the cationic dyes which exhibit nearly identical space lattice with respect to one plane or face but which are quite dissimilar for the other faces. This leads to preferential absorptions on one specific face. Auramine, Acridine Yellow, Red, and Orange, and Rhodamine are particularly preferred. Rhodamine has an additional advantage discussed below.

If temperature indicating compounds without dye agents for influencing crystallization are melted and supercooled, as is the actual case with a clinical thermometer, then they have to go through an induction period before normal recrystallization begins. This induction period in certain cases may be prohibitively long, making the thermometer irreversible. Seeding with dye agents reduces the induction period making the thermometer reversible. The time required for the melt to solidify depends upon the rate at which crystallization centers develop. The size of the crystals are a function of time. When the formation of nuclei is slow, then the crystals are large and consequently exhibit poor light scattering characteristics. This is to say, they are not as discernible in the solid state as the compounds that contain a dye agent. In the solid state the dye also increases the spot contrast with respect to the surrounding color, further enhancing the readability of the thermometer.

Only very small amounts of dye are mixed into the temperature indicating compounds. The effect on the melting point is easily determined and is considered in the calibration of the system. When the compounds are melted (liquid state), the dye absorption is very poor and does not noticeably affect the transparency of the liquid so the melted spot clearly indicates the dark background color. Since the dye helps to produce a large number of crystals of suitable size, a well defined compound with very little spread between the liquidus and solidus lines is obtained. This makes the change of state in the compound, for a given temperature, reproducible many times.

As mentioned above, the use of Rhodamine has a further advantage. The dye possesses fluorescent properties. However, when dispersed in a solid mixture, it does not fluoresce, but with the onset of melting the dye fluoresces significantly so that with the aid of UV light (dark light) the change in state is easily determined. This allows the thermometer to be read in low light level rooms without disturbing the patients.

The addition of dyes to the temperature indicating compounds increases light scattering, making the unmelted temperature indicating spots very apparent; provides color contrast with the surrounding background; increases crystallization velocity to make the thermometer reversible in a normal operation mode; and also enables a patient's temperature to be read in the dark when the device is used with UV light.

Another method of promoting crystallization comprises provision of a catalytic surface layer or seed interface by bonding, covalently, molecules that will act as nucleation centers to the temperature indicating compounds. Crystal growth is rapidly initiated in the compounds because the molecules under the influence of the layer are always properly oriented. The catalytic surface can be any fatty acid, or ester thereof, that has a significantly higher melting point than the indicating compounds. The method is practiced by applying the catalytic surface to the thermometer substrate and then a layer of the temperature indicating compounds over it where they can be influenced by the catalytic surface.

An irreversible version of the thermometer may be provided by the exclusion of the dye agents in the temperature indicating compounds. The same mixtures of hendecanoic, tridecanoic and pentadecanoic acids are used. However, the method of obtaining the proper crystal structure with the good light scattering properties, for easy discernibility, is modified in that the temperature indicating compounds are first dissolved in an organic solvent such as acetone or ether and then sprayed or placed on the thermometer surface in a thin layer. As the solvent evaporates a critical solvent concentration is reached where crystals are rapidly formed. In the solid state each pocket of temperature indicating compound is made up of a large number of these very small crystals that readily reflect visible light. When the material of each thin pocket is subjected to a temperature above its particular melting point, it rapidly melts and turns transparent, letting the dark background show through to indicate the temperature. The materials cannot revert back to their original well-defined crystal structure when cooled since all of the solvent was evaporated away prior to sealing the thermometer. Therefore it only possesses the precise readability one time. The irreversibility allows delayed reading.

These and other objects, features and advantages of the invention will be apparent from the following detailed description of preferred embodiments taken in connection with the accompanying drawing, in which,

BRIEF DESCRIPTION OF THE DRAWING

FIGS. 1 and 2 are views of opposing faces of a disposable thermometer according to a preferred embodiment of the invention;

FIG. 3 is a side view of the FIGS. 1-2 thermometer;

FIG. 4 is a cross-section view of the FIGS. 1-3 thermometer taken as indicated by double headed arrow 4—4 in FIG. 3; and FIG. 5 is a blown up cross section of a pocket portion of the device at the same section plane as FIG. 4 but illustrating a modification of the device according to a second embodiment of the invention.

DETAILED DESCRIPTION OF PREFERRED EMBODIMENTS

Referring to the drawing, FIG. 1 shows a disposable thermometer 10 with a main support layer and handle 11. Arranged on the support layer are rows of dot form pockets containing temperature indicating compounds, calibrated in steps of 0.2° F. The vertical row of indicia 12 indicates the 0.2° steps, the horizontal row 13 indicates the main level of temperature from 97° to 104.8° F. corresponding to the physiological temperature range of humans. In FIG. 1 the temperature indicating compounds are shown in an exposed pocket 15 where the material is melted and lets the dark background show through. A typical pocket of unmelted or solid indicating material is pictured at 14. A reference pocket 16 is located on the handle to aid the user in determining the reading. FIG. 1 indicates a temperature level of 98.2° F.

FIG. 2 shows the other side of the thermometer covering the higher temperature levels. The use of both sides of the probe allows for a very small exposure locus consequently allowing greater patient comfort and accurate placement.

FIG. 3 is a side view of the thermometer showing the main support base and handle 11. Bonded to the base, one on each side, are two pocket matrixes in a thin plastic sheet 18 containing the cavities to hold the temperature indicating compounds. The matrix of cavities can also be an integral part of a molded base 19 as shown in cross section in FIG. 4. Covering and sealing the filled cavities will be a thin layer of transparent inert plastic 7. Due to the thin layers and small mass, heat transfer to the temperature indicating compounds is rapid, and the mix will melt and turn transparent in less than 30 seconds as opposed to 3 minutes required for a mercury in glass thermometer.

FIG. 5 is a detail of a temperature indicating cavity when the catalytic surface layer 14 is used to control crystal structure.

The catalytic surface coatings may comprise coupling agents such as decanoyl chloride or decylamine which couple to the plastic substrate and also act as nucleation centers to induce fast recrystallization of the main body of indicating fatty acid mixture in the pockets. The coatings have higher melting points than the indicating fatty acid mixture and are transparent in solid form because of their thinness.

Other light scattering or crystal growth enhancing dyes which may be used in lieu of the preferred dyes indicated above are given in the following Table I.

TABLE I

| Name | Color | Origin-Molecular |
| --- | --- | --- |
| Sudan Violet | Violet | Anthraquinone series |
| Sudan 1 | Orange | Diazo series |
| Sudan 2 | Blue-Green | Monoazo series |
| Sudan R | Red | Monoazo series |
| Sudan 3 | Green-Purple | Monoazo series |
| Sudan 4 | Scarlet | Monoazo series |
| Oil Yellow | Yellow | Monoazo series |
| Sudan Blue | Blue | Anthraquinone Green |

TABLE I-continued

| Name | Color | Origin-Molecular |
| --- | --- | --- |
| Sudan Black | Black | Diazo series |
| Oil Yellow D | Yellow | Monoazo series |
| Indophenol Blue | Blue | Indophenol Orange |
| Sudan Purple | Purple | Anthraquinone series |
| Sudan Green | Green | Anthraquinone series |
| Chrysoidyne | Black | Monoazo series |
| Neutral Red | Red | Azine series |
| Thionine | Yellow | Thiazine series |
| Acred Yellow | Yellow | Aer. group |
| Acred Orange | Orange | Aer. group |
| Toludine Blue o | Blue | Thiazine series |
| Meldola Blue | Blue | Oxazine series |
| Safranine o | Red | Azine series |
| Astrazone o | Orange | Polymeth. series |
| Methylene Green | Green | Thiazine series |
| Acronol Phloxine FF.S | Red | Polymeth. series |
| Astrazone Red 6B | Oil-Yellow | Polymeth. series |
| Brilliant Green | Green | Trimeth. series |
| Rhodamine 6G | Red | Xanthine series |
| Induline | Blue | Azine series |
| Alixarin Yellow | Yellow | Monoazo series |
| Fluorescent acid Eruthrosine B | Yellow-orange | Xanthine series |
| Quinoline Yellow kt | Yellow | Monoazo series |
| Soledon Yellow | Yellow | Monoazo series |
| Crysophene | Yellow | Monoazo series |
| Brilliant Orange R | Orange | Monoazo series |
| Flavozine | Yellow | Monoazo series |
| Rocellin | Red | Monoazo series |
| Orange G | Orange | Monoazo series |
| Sunsen Yellow FCF | Yellow | Monoazo series |
| Metanil Yellow | Yellow | Monoazo series |
| Alazarin Rubinol 3G | Yellow | |
| Anthozine 5B | Red | |

The catalytic surface coatings may be: DECANOYL CHLORIDE—$CH_3(CH_2)_8COCl$ or DECYLAMINE—$CH_3(CH_2)_9NH_2$.

The preferred binary mixture of tridecanoic and pentadecanoic acid for one degree human body temperature steps (centigrade) is given in the following Table II.

TABLE II

| Melting Point Temp. °C. | Weight % | |
| --- | --- | --- |
| | Tridecanoic | Pentadecanoic |
| 37 | 81.1 | 18.9 |
| 38 | 87.0 | 13.0 |
| 39 | 91.2 | 8.8 |
| 40 | 94.6 | 5.4 |
| 41 | 97.6 | 3.4 |

Fractional degree mixtures may be determined by interpolation from Table II. Other n-decanoic acids, or more generally higher fatty acids (greater than 6 carbon atoms) of odd number series may be employed provided adjacent members of such series are selected as A and B in an $A_n B_{1-n}$ binary mixture thereof where n is a weight fraction, e.g., 11-carbon hendecanoic acid as A and 13-carbon tridecanoic acid as B. The liquidus of any such mixture should be essentially linear over the range of mixtures providing melting at body temperature range. The components A and B should be stable and skeletally compatible with each other to provide a stable mixture. Generally such criteria can be met by several inorganic and organic compounds including saturated aliphatic carboxylic acids, monoketo almanoic acids and hydroxyalkanoic acids and their esters, alcholors, triglycerides (esters of glycerol with higher fatty acids) and halogenated saturated carboxylic acids.

The pockets of temperature indicating material are preferably 10-30 mils thick and have a spot size of circular form with 0.8-1.2 mm diameter. The regions of indicating compound may comprise built up dots or the like instead of pockets. The amount of dye added to the binary mixture of indicating materials is $10^{-3}$ to $10^{-6}:1$ mole ratio, and this corresponds essentially to up to 0.05 weight percent, preferably 0.001 weight percent as an upper limit. A lower limit for dye addition is at least an effective amount for accelerating recrystallization so that resolidification occurs in less than an hour, preferably less than five minutes at 30° C. The dye is added to the liquid mixture and dissolved therein.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A thermometer comprising:
    means defining an array of regions containing crystalline heat sensitive materials which undergo a reversible change in state of crystallization from a crystalline solid to a viscous liquid at a progressive series of predetermined temperature levels to produce opacity changes at said regions,
    the materials comprising saturated aliphatic carboxylic acid mixtures, and esters thereof, of adjacent members of the same odd carbon atom number series and being effective to retard the rate of recrystallization of said heat sensitive materials between temperatures of about room temperature to said predetermined temperature levels.

2. Thermometer in accordance with claim 1 wherein said temperature indicating materials are mixtures of at least two adjacent acids selected from the group consisting of hendecanoic, tridecanoic and pentadecanoic acids.

3. Thermometer in accordance with claim 1 and further comprising,
    means for enhancing light scattering characteristics within said regions.

4. Thermometer in accordance with claim 3 wherein said means for enhancing comprise cationic dye seeding in said material.

5. Thermometer in accordance with claim 1 and further comprising,
    means for enhancing crystallization of the temperature indicating materials from the liquid state making the thermometer reversible.

6. Thermometer in accordance with claim 1 wherein pockets of temperature indicating materials are arrayed on both sides of a flat thermometer body slab.

7. Thermometer in accordance with claim 1 wherein the body slab comprises a laminate of a pocket containing layer overlaid with a thin sealing layer constructed and arranged to establish a response time of 30 seconds or less for measurement.

8. Thermometer in accordance with claim 1 wherein catalytic surfaces are disposed in the regions to provide nucleation centers for crystallization enhancement.

9. Thermometer in accordance with claim 1 and further comprising means defining a reference indicator on the thermometer for comparatively illustrating one of the two state appearances of the regions.

10. Thermometer in accordance with claim 1 made by the method of dissolving state changing material in a solvent, spraying the solution into said regions in a thin layer and evaporating the solvent to form multiple small crystals in each region.

11. A thermometer comprising,
   means defining an array of regions containing crystalline materials which undergo a change in state of crystallization at a progressive series of predetermined temperature levels to produce opacity changes at said regions,
   the materials comprising saturated aliphatic carboxylic acid mixtures, and esters thereof, of adjacent members of the same odd carbon atom number series,
   means for enhancing crystallization of the temperature indicating materials from the liquid state making the thermometer reversible,
   wherein said means for enhancing comprise cationic dye seeding material.

12. Thermometer in accordance with claim 11 wherein the dye is selected from the class consisting of Acridine yellow, Acridine red, Acridine orange, Rhodamine and Auramine.

13. Thermometer in accordance with claim 12 wherein the dye is fluorescent Rhodamine.

14. Method of using the thermometer of claim 13 to show change in state of temperature indicating compounds in dark or low light level rooms by shining ultraviolet dark light source thereon to make readings.

15. A thermometer comprising,
   means defining an array of regions corresponding to a series of body temperature value increments and containing opaque solid heat sensitive materials in each such region which undergo a reversible change in state of crystallization from a crystalline solid to a viscous liquid at a progressive series of predetermined temperature levels to produce opacity changes at said regions for melting to a transparent liquid when heated to a particular body temperature within such series,
   the material of essentially all said regions comprising a mixture $A_nB_{1-n}$ wherein A and B are skeletally compatible, stable, chemical compounds of differing melting points with an essentially linear liquidus over a range of temperatures corresponding to the range of body temperatures to be detected and being effective to retard the rate of recrystallization of said heat sensitive materials between temperatures of about room temperature to said predetermined temperature levels and further comprising within each said region means for accelerating recrystallization of said mixture after melting and recooling.

16. Thermometer in accordance with claim 15 wherein said accelerating means comprise within each said mixture as up to 0.05 weight percent thereof, and in at least an effective trace amount for accelerating recrystallization of such mixture after melting and recooling, a seed material for crystal nucleation.

17. Thermometer in accordance with claim 15 wherein said means for accelerating recrystallization of said mixture comprise a catalytic surface coating in each of said regions overlaid with a thin layer of said mixture.

18. Thermometer in accordance with claim 15 wherein said materials A and B are organic compounds selected from the class consisting of odd carbon-atom-number higher fatty acid series and esters thereof and wherein A and B are adjacent members of said series.

19. Thermometer in accordance with claim 15 wherein said regions comprise shallow pockets arrayed on opposite sides of a thin substrate and overlaid with thin converings and constructed and arranged to afford a body measuring response time of less than 30 seconds.

20. A thermometer comprising,
   means defining an array of regions corresponding to a series of body temperature value increments and containing opaque solid materials in each such region for melting to a transparent liquid when heated to a particular body temperature within such series,
   the material of essentially all said regions comprising a mixture $A_nB_{1-n}$ wherein A and B are skeletally compatible, stable, chemical compounds of differing melting points with an essentially linear liquidus over a range of temperatures corresponding to the range of body temperatures to be detected and further comprising within each said region means for accelerating recrystallization of said mixture after melting and recooling,
   said accelerating means comprise within each said mixture as up to 0.05 weight percent thereof, and in at least an effective trace amount for accelerating recrystallization of such mixture after melting and recooling, a seed material for crystal nucleation,
   wherein said seed material comprises a cationic dye.

21. Thermometer in accordance with claim 20 wherein said dye is fluorescent.

22. A thermometer including a heat sensitive material which undergoes a reversible change of state from a crystalline solid to a viscous liquid at a predetermined temperature,
   said heat sensitive material comprising a mixture including at least one low molecular weight organic compound that is effective to retard the rate of recrystallization of said material between temperatures of from about room temperature to said predetermined temperature.

23. The thermometer of claim 22 including a plurality of heat sensitive materials each of which undergoes a reversible change of state from an opaque crystalline solid to a transparent liquid at a different predetermined temperature.

24. The thermometer of claim 23 wherein said mixture comprises a binary mixture of low molecular weight organic compounds.

25. The thermometer of claim 22 wherein said heat sensitive material includes a nucleating agent.

* * * * *